Patented Nov. 12, 1929

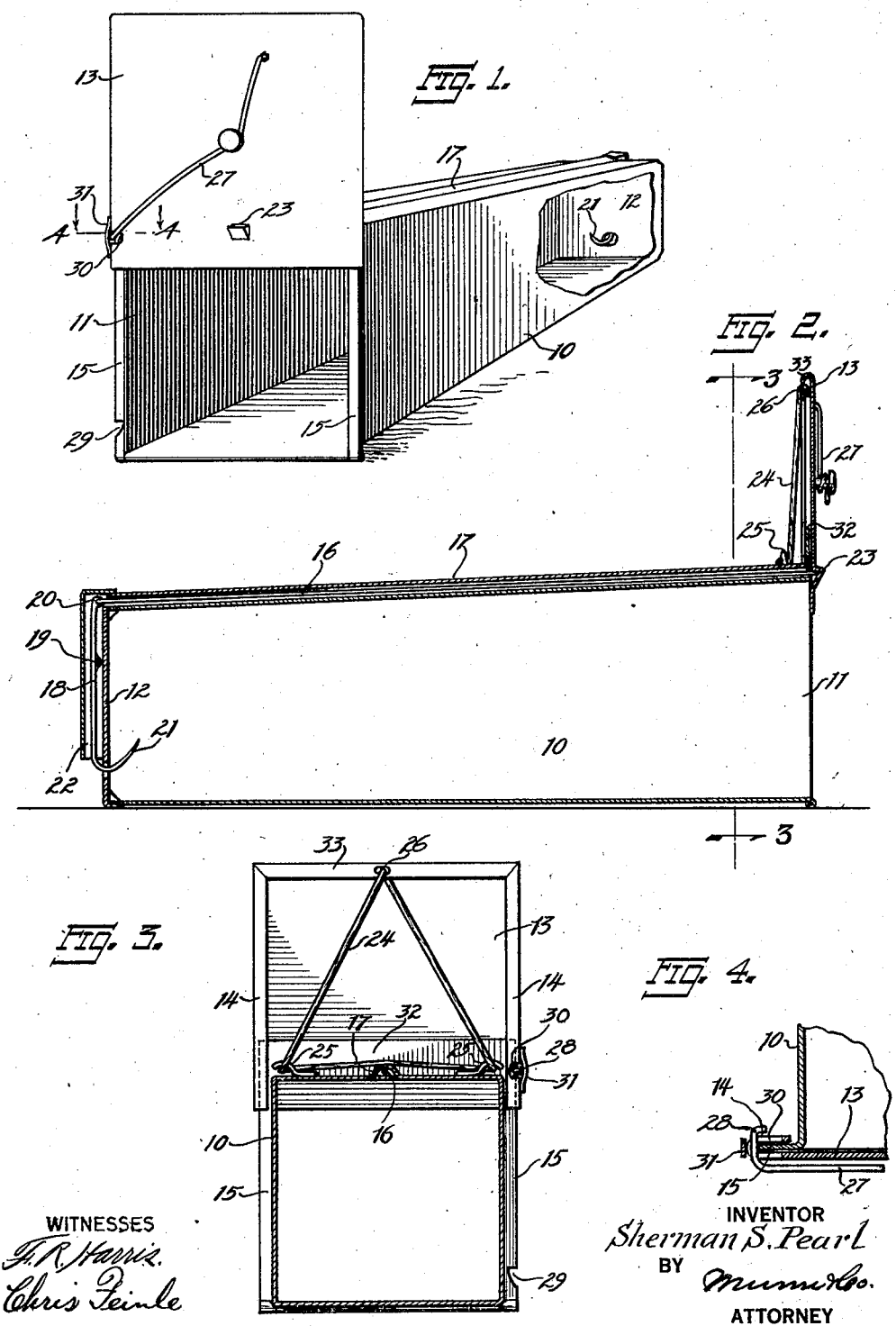

1,735,786

UNITED STATES PATENT OFFICE

SHERMAN S. PEARL, OF STEHEKIN, WASHINGTON

TRAP

Application filed October 14, 1927. Serial No. 226,182.

This invention relates to traps, and has especial reference to the class of traps adapted to trap rodents.

The principal object of the present invention is to provide a trap of the indicated character which is of simple and novel construction, one which is inexpensive to manufacture, and one which is reliable in operation.

The nature of the invention and its distinguishing features and advantages will appear when the following specification is read in connection with the accompanying drawing, in which—

Figure 1 is a perspective view of the trap in open or set position, a portion being broken away to show one of the features of the invention.

Fig. 2 is a central longitudinal sectional view through the trap.

Fig. 3 is a transverse sectional view taken on the line 3—3 of Fig. 2 and looking in the direction indicated by the arrows.

Fig. 4 is an enlarged detail sectional view taken on the line 4—4 of Fig. 1 and looking in the direction indicated by the arrows.

Referring now more particularly to the views of the drawing, it will be apparent that, the trap of the present invention includes a cage or hollow body or box 10 of tapered construction of any size and made preferably of metal, having an open end 11 and a closed end 12. A closure or trap door 13 is adapted to control the open end 11. The trap door 13 is mounted for movement to an opened and closed position, and in the present instance is accomplished by the provision of channels 14 respectively on the opposite side edges of the door 13 and flanges 15 respectively on the opposite side walls of the cage or box 10 adjacent the open end 11 thereof. The flanges 15 are respectively received in the channels 14, and the trap door 13 is thus mounted for up and down sliding movement.

Means which operates in conjunction with the trap door 13 to releasably hold the latter in an opened or set position consists of a latch rod 16 arranged for sliding or longitudinal movement in opposite directions in a guide 17 on the top of the cage or box 10, and a bait holder 18 which is pivotally mounted as at 19 and has the upper end thereof pivotally connected as at 20 with the latch rod 16, and the opposite end 21 thereof is in the form of a pointed hook which extends through a hole in the end 12 into the cage or box 10. The bait holder 18 is protected by an outside guard 22. The latch rod is movable into and out of engagement with a shoulder 23 on the trap door 13.

When the bait holder 18 is moved from its set position shown in Fig. 2 by the rodent nibbling on the bait arranged on the end 21 causing disengagement of the latch rod 16 from the shoulder 23 means automatically operable serves to quickly close the trap door 13. In the present instance said means consists of an elastic band 24 connected with hooks 25 or the like on the top of the cage or box 10, and also connected as at 26 with the upper edge of the trap door 13.

In order to releasably hold the trap door 13 in its closed position, there is provided suitable latching means, in the present instance, consisting of a spring latch member 27 carried by the trap door 13, said latch member 27 having a portion 28 which rides along the edge of one of the flanges 15 and is adapted to engage in a notch 29 in the related flange 15. The related channel 14 is cut out as at 30 for the proper disposition of the portion 28, and has a guard 31 which prevents excessive outward flexing of the latch member 27. The trap door 13 is limited in its downward movement by a transverse flange 32 on the top wall of the cage or box 10 which is encountered by a channel 33 on the upper edge of the trap door 13.

From the foregoing it will be apparent that, when the trap is in the open or set position as shown most clearly in Fig. 2, movement of the bait holder 18 by the rodent will disengage the latch rod 16 from the shoulder 23 followed instantly by the action of the band 24 which moves the trap door 13 to a closing position, and followed by the portion 28 of the spring latch member 27 springing into the notch 29 to hold the trap door 13 closed, trapping the rodent within the cage or box 10.

I claim:

1. A trap comprising a box open at one end and closed at the opposite end and having its top provided with a guideway extending throughout the length thereof, a trap door, means for slidably mounting the trap door for movement to control the open end of said box, a latch rod slidably mounted in the guideway into and out of engagement with said trap door, a pivotally mounted bait holder on the outer face of the closed end of the box and pivotally connected at one end with said latch rod and the opposite end thereof having a portion extending into the box at its closed end through an opening in said end, said latch rod being engageable with the trap door to hold it in an opened position, a guard on the closed end of the box for the bait holder, and spring means acting on the trap door to close it when said latch rod is disengaged in response to the movement of the bait holder.

2. A trap, comprising a box open at one end and closed at the other end, the open end having flanges on its side walls and the closed end provided with an aperture, a door having in its side edges channels receiving the flanges of the box, and provided with a shoulder, a spring acting on the door to close it, a latch rod slidably mounted on the top of the box for engagement with the shoulder of the door, to hold it open, said rod extending beyond the closed end of the box, a bait holder pivotally mounted on the closed end of the box and having one end pivoted to the end of the latch rod, the other end of the bait holder projecting through the aperture of the closed end of the box into said box, and cooperating means on the door and box for locking the door closed.

3. In a trap, a box open at one end and closed at the other, the open end having flanges on its side walls, one of which is provided with a notch, a door having channels in its sides receiving the flanges of the box, the channel receiving the flange with the notch having a cut out portion, means for holding the door elevated, a bait holder connected with said means, and means for locking the door closed, said means consisting of a spring member, mounted on the door and having one end extending over the flange of the box having the notch and engaging said notch when the door is closed.

4. A trap comprising a box open at one end and closed at the other end, the box tapering from its open end to the closed end so that the top wall is inclined rearwardly, a door slidably mounted across the open end and provided with a shoulder, a resilient means acting on the door to close it, a latch rod slidably mounted on the inclined top of the box for engagement with the shoulder on the door to retain said door open, said rod extending beyond the closed end of the box, a bait holder pivotally mounted on the closed end of the box and having one end pivoted to the end of the latch rod, the closed end of the box having an aperture, the other end of the bait holder projecting through the aperture and into said box and co-operating means on the door and box for locking the door closed, rocking of the bait holder causing sliding movement of the latch rod on the inclined top of the box to release the door.

Signed at Moore in the county of Chelan and State of Washington this 7th day of October, A. D. 1927.

SHERMAN S. PEARL.